UNITED STATES PATENT OFFICE.

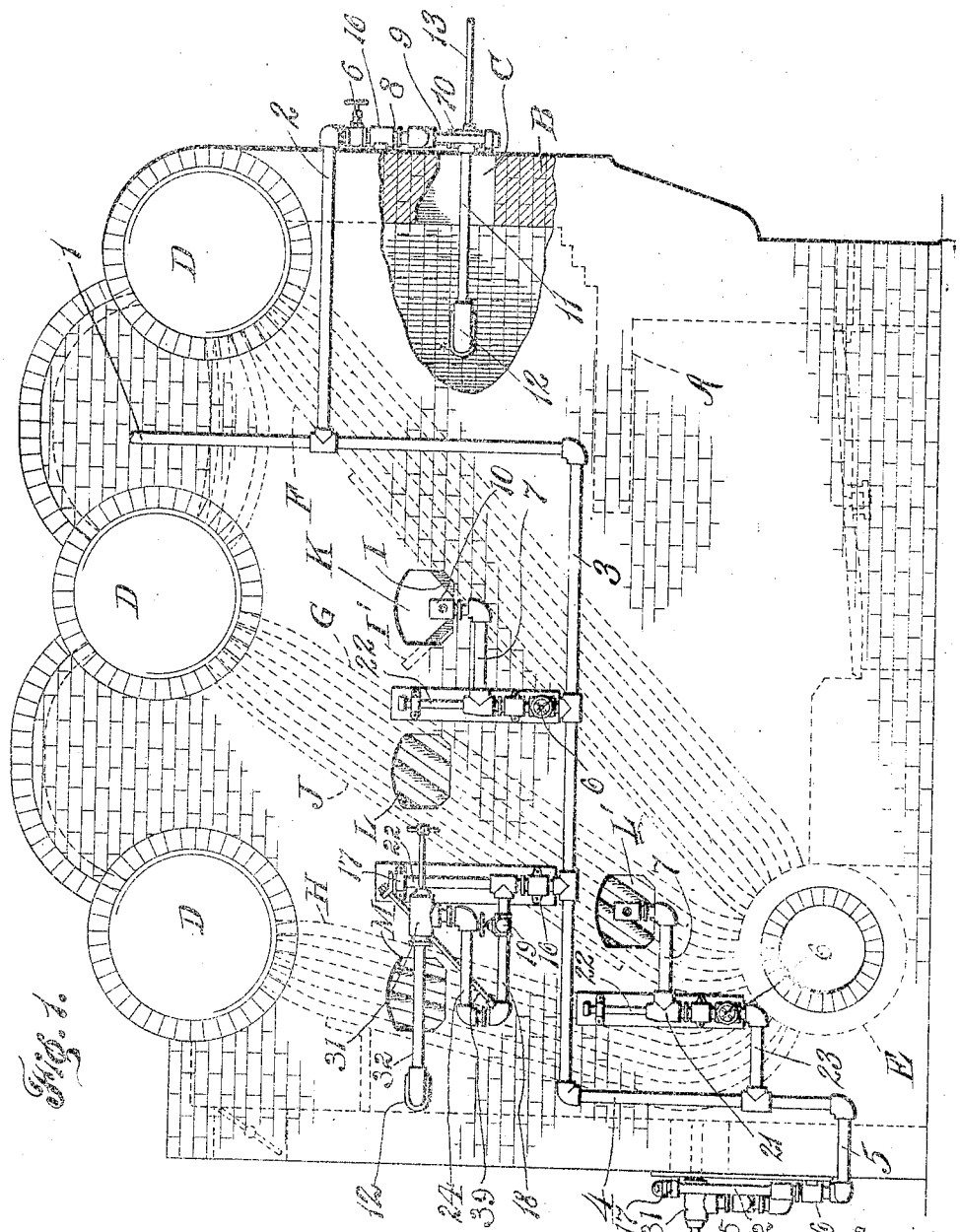

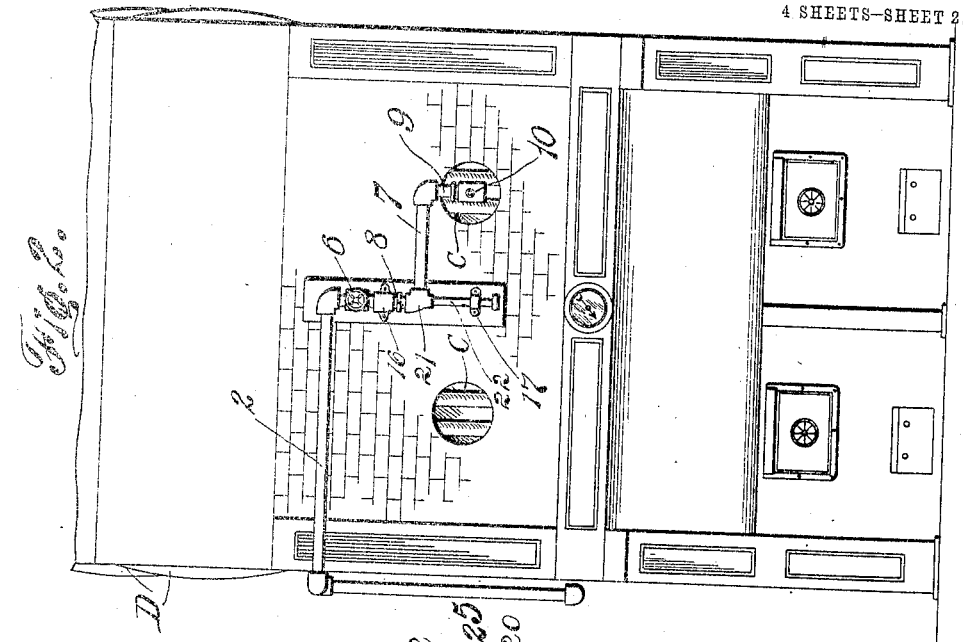
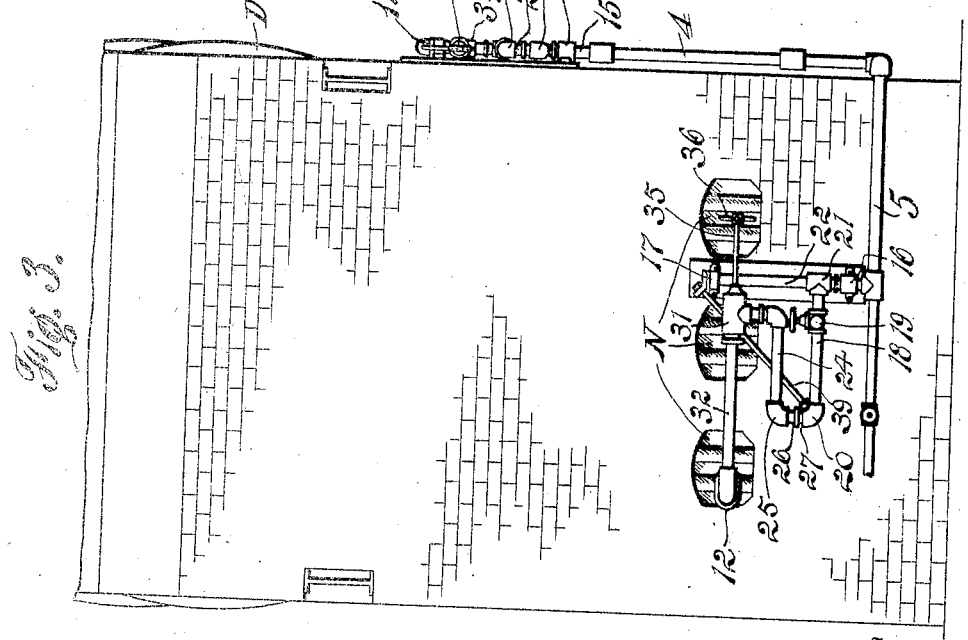

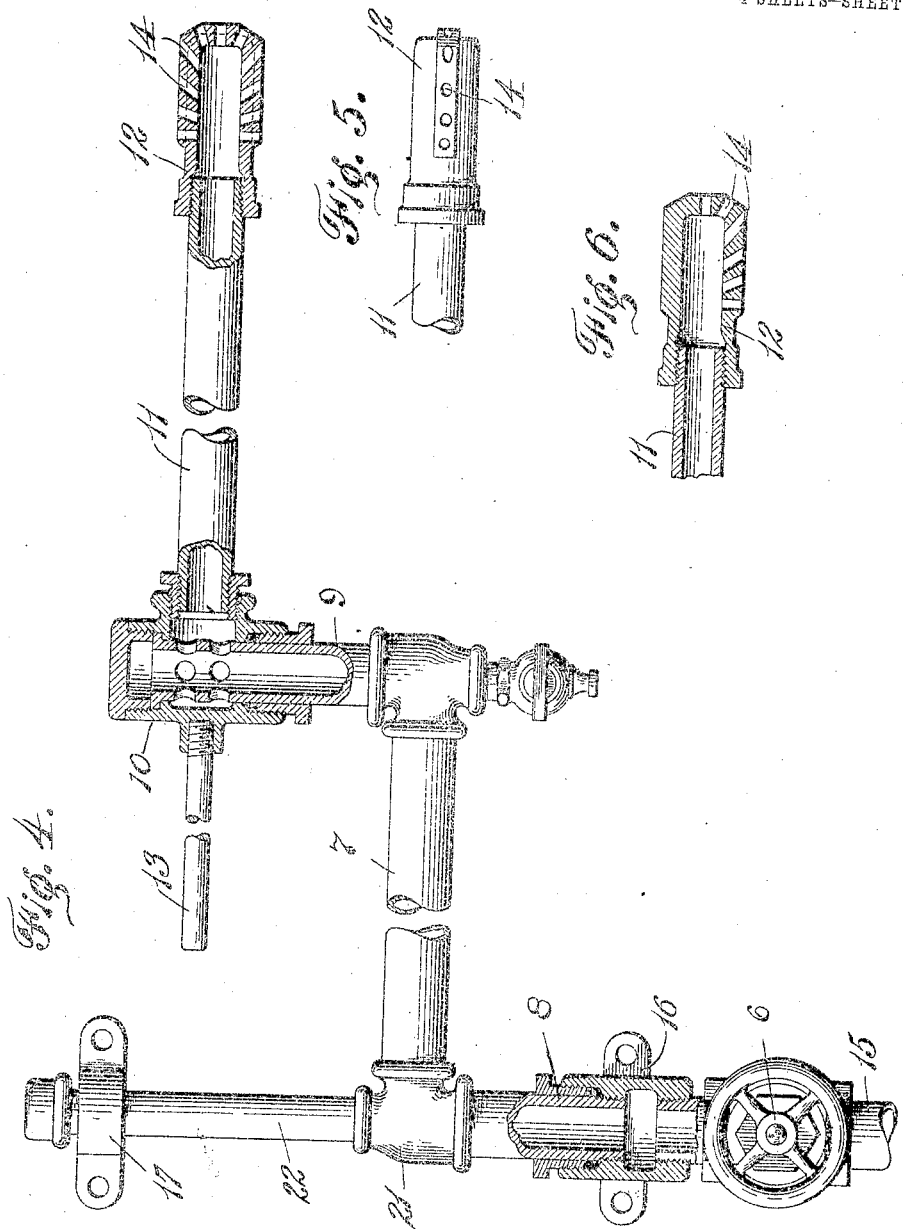

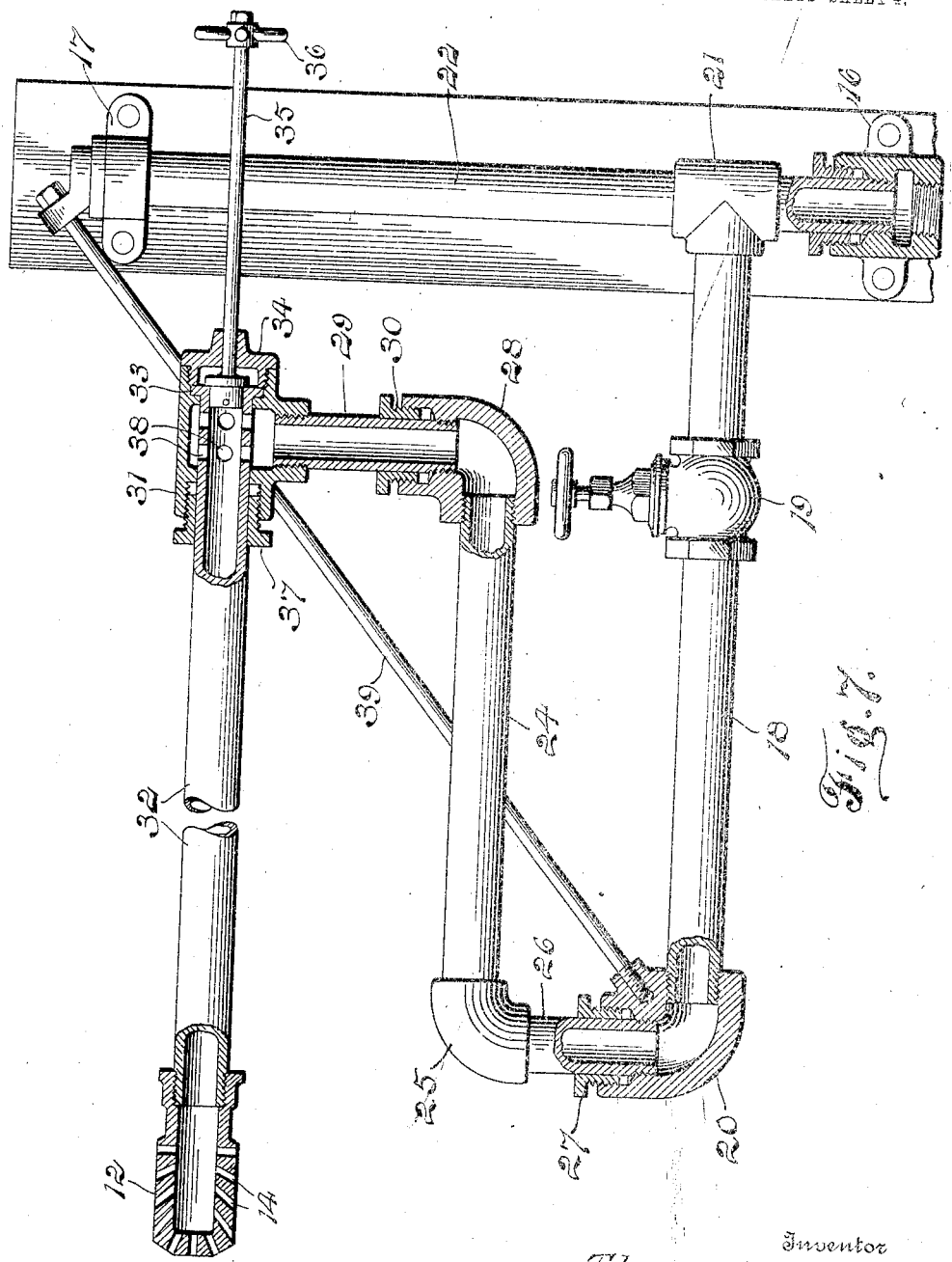

THOMAS S. WALLER, OF DETROIT, MICHIGAN, ASSIGNOR TO DIAMOND POWER SPECIALTY COMPANY, OF DETROIT, MICHIGAN, A CORPORATION OF

BLOWER FOR BOILERS.

1,100,165.

Specification of Letters Patent. Patented June 16, 1914.

Application filed March 14, 1912. Serial No. 683,893.

*To all whom it may concern:*

Be it known that I, THOMAS S. WALLER, a citizen of the United States of America, residing at Detroit, in the county of Wayne and State of Michigan, have invented certain new and useful Improvements in Blowers for Boilers, of which the following is a specification, reference being had therein to the accompanying drawings.

This invention relates to improvements in blowers for boilers and the object of the invention is to provide a construction and arrangement especially adapted for effectively and expeditiously blowing all parts of Sterling and similar types of boilers.

A further object is to provide a construction particularly adapted to this type of boiler and which is such that the blower nozzles may be inserted through the usual clean-out openings in the wall of the boiler and may be retracted therefrom when not in use.

With these and other ends in view the invention consists in the matter hereinafter set forth and more particularly pointed out in the claims reference being had to the accompanying drawings in which, Figure 1 is a side elevation of a boiler setting with a blower embodying the invention in place thereon; Fig. 2 is a front elevation of the same; Fig. 3 a rear elevation; Fig. 4 is an enlarged detail of one of the blower nozzles and adjacent parts showing the same partially in section; Fig. 5 is an elevation of one of the blower nozzles; Fig. 6 is a modified construction of nozzle showing the same in section; and Fig. 7 is a detail similar to that of Fig. 4 showing a double arm nozzle support.

The invention is shown as applied to a Sterling boiler of a well known construction, but it is obvious that it may be applied to any boiler of this type.

As commonly constructed, a fire arch A, shown in dotted lines in Fig. 1, extends over the fire chamber, and in the front wall B of the furnace above said arch are provided with the usual clean-out openings C. Extending across the upper end of the furnace are the three steam drums D and at the bottom and near the rear wall of the setting is the usual mud drum E, said mud drum and steam drums being connected by three inclined banks of tubes, F, G and H. Over the bank F is a baffle I extending from the mud drum upward to near the forward steam drum and a similar baffle J is located adjacent to the rear side of the bank G of tubes, extending downward from the middle steam drum to near the mud drum. A short baffle I' extends laterally from the baffle I toward the bank G of tubes to cause the products of combustion to travel through said bank on their downward course between the banks F and G. In the side wall of the boiler setting are the usual clean-out openings, an opening K being located opposite the angle formed by the meeting of the baffles I and I', openings L and L', located opposite the bank of tubes G, and the opening M, opposite the bank H adjacent to the rear wall of the furnace, which wall is preferably provided with three clean-out openings N arranged in a horizontal row adjacent to the lower ends of the tubes of the bank H and near the top of the mud drum.

Located adjacent to the side wall of the furnace setting is a vertical steam supply pipe 1 which may be connected to the boiler or any other source of steam or other gaseous fluid under pressure, and a branch supply pipe 2 extends laterally from the pipe 1 and across the front of the furnace over the openings C. A branch supply pipe 3 extends laterally from the lower end of the pipe 1 across the side wall of the boiler setting to a vertical branch 4 and leading from the lower end of said branch is a supply pipe 5 extending across the rear wall of the boiler setting below the openings N.

The end of the pipe 2 is turned downward and supported by brackets 16 and 17 on the wall mid-way between the openings C. Said pipe is also provided with a shut-off valve 6 and a swinging arm or branch 7 is connected to the lower end of this pipe by a packed pivot 8 and an elbow 21 which is provided with an extension rod 22 to engage the bearing 17 and form a pivotal support for the arm 7, said support permitting said arm to swing upon a vertical axis from one to the other of said openings. The outer end of said arm is provided with a downwardly extending connection 9 to the lower end of which a pivot head is attached. Screwed into an opening in one side of the head 10 to swing about the axis thereof and receive steam therefrom, is a nozzle pipe 11 provided with a nozzle 12 at its free end, said head being turned to swing the pipe, by means of a handle 13 secured in a socket on the head, and thus the operator may swing the arm 7 into position before either of the openings C and then swing the nozzle pipe into position to project through one of the openings.

The nozzle 12 is formed with a single row of jet openings 14 arranged in a vertical plane in the sides and end of the nozzle to direct jets of steam upwardly, downwardly and forwardly. These steam jets strike the bank F of boiler tubes and blow all of the accumulation of soot and products of combustion therefrom and at the same time the jets at the lower side of the nozzle strike the top of the arch A and blow all accumulation therefrom. The nozzle pipe may be swung from side to side within the openings C to direct the jets against all of the tubes and blow the accumulation of soot from every part of the arch.

Extending upwardly from the supply branch 3 adjacent to the opening K, is a vertical pipe 15 which is secured to the face of the side wall of the boiler setting by the brackets 16 and 17 in the same manner in which the downturned end of the pipe 2 is held in place, this pipe 15 being equivalent to said downturned end and provided with a like branch 7 and nozzle pipe 11 which is adapted to be projected through the opening K into the angle between the baffles I and I'. The nozzle 12 upon this nozzle pipe, is preferably formed as shown in Fig. 6 with its jet openings 14 opening through the lower side and end of the nozzle only, to direct jets of steam downwardly into the angle between said baffles and blow out all accumulation of soot and products of combustion which may have lodged therein.

Extending laterally from the vertical branch supply pipe 4 is a short horizontal supply pipe 23 for supplying steam to a bracket pipe 15 located adjacent to the opening L' and provided with a swinging branch arm and nozzle pipe arranged similarly to those adjacent to the opening K, and adapted to be projected through said opening and blow the lower ends of the bank of tubes G and the top of the mud drum E.

Between the openings L and M, a bracket pipe 15 extends upward from the supply branch 3 and is supported in place in the same manner as the other bracket pipes by the bracket 16 adjacent to the supply branch and the bracket 17 engaging the extension rod 22. A double-arm blower shown in detail in Fig. 7 is carried by this bracket pipe and consists of a branch pipe or tubular arm 18 screwed into the fitting 21 and provided with a shut-off valve 19. The opposite end of said arm is provided with an upturned elbow 20 to which a parallel swinging arm or branch 24 having a down-turned elbow 25 is connected by a short vertical pipe 26 and packed pivot 27, to swing in a horizontal plane parallel with the plane of movement of the arm 18. The opposite end of the arm 24 is provided with an upturned elbow 28 to receive a short vertical connecting pipe 29 pivotally attached thereto by a packed pivot 30 and upon the upper end of said connecting pipe is a hollow head or casing 31 with its longitudinal bore extending at right angles to the axis of said pipe 29 to receive a nozzle pipe 32, one end of which is held to turn freely therein by a rib 33 on its end engaging a rib in the casing, and a head 34 screwed into the end of the casing, which head forms a bearing for a rod 35 secured at its inner end to the end of the nozzle pipe and provided with a hand wheel 36 on its outer end by means of which it may be turned to rotate the pipe 32. A packing nut 37 in the end of the head around said nozzle pipe forms a tight joint to prevent leakage of steam, and holes 38 in the pipe within the head afford communication between said nozzle pipe and the short pipe 29. To support the weight of the nozzle arms and take the strain from the arm 18, a brace rod 39 is secured at one end of the elbow 20 on the outer end of said arm and it extends diagonally upward and is secured at its opposite end to an ear on the extreme upper end of the extension rod or pipe 22 which engages the bracket 17, said arm 18, rod 39 and bracket pipe 22 thus forming a triangular supporting frame for the horizontally swinging double-arm blower. This frame may be turned to either side of its support to bring the arms in position in front of either of the openings L or M and by properly swinging said arms and nozzle pipe relatively, the pipe may be projected through the opening and between any of the boiler tubes extending across the opening. By means of the handle 35 the nozzle pipe may be turned on its axis to adjust the nozzle to the inclination of the tubes so that it may be projected between them and blow longitudinally thereof or may be turned to direct its jets across the tubes.

The steam supply branch 5 extending across the rear wall of the boiler setting is also provided with a bracket pipe 15 supported in a like manner between two of the openings N and a double-arm construction the same as that provided for the openings L. M. is attached thereto. By making said arms of the proper length, the nozzle pipe may be projected through any one of the three openings and inserted between the boiler tubes to blow their lower ends where they enter the mud drum and to blow the accumulation of soot from the top of said drum. The nozzle pipe may also be turned as described to project the steam jets in any desired direction.

With this construction and arrangement of parts every portion of the interior of the boiler setting may be blown free of any accumulation of the products of combustion and each of the nozzles may be quickly and easily manipulated and are adapted to be withdrawn from the interior of the boiler setting when not in use to prevent the same from being injured by the extreme heat within the boiler chamber. Owing to the number of jointedly connected arms, the nozzle pipe may be manipulated so that it will enter any of the spaces between the boiler tubes opposite each opening and then be projected far across the bank of tubes to blow all parts thoroughly. The arrangement whereby the nozzle pipe may be turned on its longitudinal axis permits the turning of the nozzle so that it may be inserted within the narrow spaces between the boiler tubes regardless of the inclination or direction of said tubes and may be turned to direct the steam in any desired direction. Obviously the double-arm construction may be used for any or all of the openings in the boiler setting and any desired number of pivotally connected arms may be used. The supply pipe may also be arranged in any convenient position as may also the brackets for supporting the several swinging arms of the blowers. Other modifications in the construction and arrangements of parts may also be made without departing from the spirit of my invention and I do not wish to limit myself to the particular construction and arrangement shown.

Having thus fully described my invention what I claim is:—

1. The combination with a Sterling type boiler, having sets of water tubes of different inclinations, baffles following the inclinations of and transverse to the several sets of tubes, and a setting with openings in the side, front and rear walls thereof, of a blower provided with nozzle pipes articulated to swing in and out of the openings and to direct jets of steam across and along the baffles and the meeting angles thereof and between and across the water tubes.

2. The combination with a boiler having sets of water tubes inclined at different angles, baffles across the tubes and transversely disposed to each other and a boiler setting with openings at the side, front and rear thereof, of a blower supported on the wall and provided with nozzle pipes articulated to swing in and out of the openings and to direct jets of steam along and across the baffles and the meeting angles thereof and between and across the boiler tubes.

3. The combination with a boiler of the Sterling type, having sets of water tubes of different inclinations, baffles following the sets of pipes and transverse thereto, and a boiler setting with openings at the side, front and rear thereof, of a supply pipe mounted on the wall and nozzle pipes articulated thereto to swing in and out of the openings across and along the baffles and the meeting angles thereof and between and across the water tubes.

4. The combination with a boiler having a baffle at one side of its tubes and a laterally extending baffle, and a wall of the boiler setting for said boiler having an opening therein opposite said baffles, of a blower member supported at the outer side of said wall adjacent to said opening and adapted to be projected through the opening into the angle formed by the meeting of said baffles and retractable therefrom by the swinging thereof.

5. The combination with a boiler setting having a wall provided with a horizontal row of openings and a boiler within the setting having a bank of tubes opposite said openings, of a supply pipe extending across the wall at the outer side thereof, a branch pipe communicating with the supply pipe and pivotally supported at one end to swing in a horizontal plane adjacent to the lower side of said openings to bring its free end opposite any one of said openings, a second branch pivotally connected to the free end of said branch to swing in a plane parallel to said first branch, and a nozzle pipe pivotally attached at one end of the free end of the second branch pipe to swing upon a vertical axis and to be projected through any one of said openings by the swinging of said branch pipe.

6. The combination with a boiler having sets of tubes of different inclinations, baffles following the tubes and baffles transverse thereto, and a boiler setting having front, side and rear walls with openings therethrough, of a supply pipe extending across the outer side of the setting, and a nozzle pipe articulated to the supply pipe to swing in horizontal planes in and out of the openings past the baffles and the pipes for directing jets of steam along and across them.

7. The combination with a boiler having sets of water tubes of different inclinations, baffles following the inclination of the pipes, baffles transverse thereto and a setting having openings adjacent the sets of tubes and the baffles, of a supply pipe extending across the setting wall, branch pipes connecting with the supply pipe and swinging in a plane transverse to the water tubes, and nozzle pipes articulated to the branch pipes to be moved in and out of the openings for directing steam along and across the pipes and baffles and into the angles between the latter.

In testimony whereof I affix my signature in presence of two witnesses.

THOMAS S. WALLER.

Witnesses:
 ANNA M. DORR,
 OTTO F. BARTHEL.